United States Patent [19]

Chu-Ba

[11] Patent Number: 4,806,425

[45] Date of Patent: Feb. 21, 1989

[54] ISULATED ELECTRICAL PRODUCTS AND PROCESSES OF FORMING SUCH PRODUCTS

[75] Inventor: Cao Chu-Ba, Plano, Tex.

[73] Assignee: Capital Wire & Cable Corporation, Plano, Tex.

[21] Appl. No.: 209,912

[22] Filed: Jun. 22, 1988

Related U.S. Application Data

[63] Continuation of Ser. No. 708,594, Mar. 6, 1985, abandoned.

[51] Int. Cl.[4] .......................... B32B 15/00; H01B 7/00

[52] U.S. Cl. ................................ 428/379; 174/110 V; 428/372; 428/375; 428/389

[58] Field of Search ............... 428/375, 379, 383, 372, 428/389; 174/110 V

[56] References Cited

U.S. PATENT DOCUMENTS

| | | | |
|---|---|---|---|
| 2,349,413 | 5/1944 | Hemperly | 428/262 |
| 2,413,673 | 12/1946 | Sears | 428/382 |
| 3,205,189 | 9/1965 | Reed | 524/297 |
| 3,639,318 | 5/1968 | Tijunelis et al. | 524/297 |
| 3,842,027 | 10/1974 | Richardson | 524/295 |
| 3,941,908 | 2/1976 | Valia et al. | 428/379 |
| 3,953,650 | 4/1976 | Sauer et al. | 428/418 |
| 4,008,368 | 2/1977 | Leuchs | 524/141 |
| 4,098,753 | 7/1978 | Tsigdinos | 524/296 |
| 4,126,568 | 11/1978 | Rogers | 524/376 |
| 4,154,892 | 5/1979 | Glatti et al. | 428/375 |
| 4,501,928 | 2/1985 | Ishitobi | 428/356 |

OTHER PUBLICATIONS

Perry, Norman L., "The Compounding of Polyvinyl Chloride," Chapter 17, Encyclopedia of PVS, Nass, L.I., Editor, Marcel Decker, Inc., 1976, pp. 847-902.

Kirk-Othmer, Encyclopedia of Chemical Technology, 3rd Edition, 1982, John Wiley & Sons, vol. 18, "Plasticizers," pp. 126-152.

Bias, C. D. and Touchette, N. W., "Polyvinyl Chloride-The Function of Plasticizers and Fillers in High-Performance Electrical Compounds," American Chemical Society, 1975.

Sears, J. K. et al., The Technology of Plasticizers, John Wiley & Sons, 1982, pp. 381-387.

*Primary Examiner*—Lorraine T. Kendell

*Attorney, Agent, or Firm*—Richards, Harris, Medlock & Andrews

[57] ABSTRACT

High temperature insulated electrical wiring products suitable for use under service temperature classifications of at least 90° C. The product comprises an electrical conductor and a polyvinyl chloride insulation covering on the conductor. The insulation comprises polyvinyl chloride resin having an inherent viscosity within the range of 1.0-1.1 and a polybasic aromatic ester plasticizing system in which the predominant ester component is a dialkyl phthalate ester. Each of the alkyl groups of the ester contains at least 11 carbon atoms. In addition, the insulation contains a higher than normal amount of antioxidant. The insulation should contain at least about 1.5 percent bisphenol A based upon the dialkyl phthalate ester. The plasticizer system may contain only dialkyl phthalate ester or it may contain minor amounts of trimellitate ester. Also disclosed is a production process for electrical wiring products in which a hot melt of PVC insulation formulation as described above is extruded onto an electrical conductor and the conductor then cooled to form the insulated wiring product. The extrusion procedure may be carried out at lower than normal temperature and higher than normal extrusion rates.

13 Claims, No Drawings

ISULATED ELECTRICAL PRODUCTS AND PROCESSES OF FORMING SUCH PRODUCTS

This is a continuation of application Ser. No. 708,594, filed Mar. 6, 1985, and now abandoned.

TECHNICAL FIELD

This invention relates to insulated electrical products and more particularly to high temperature wiring products and methods of formulating such products employing new and improved plasticizer systems.

BACKGROUND OF THE INVENTION

It is a conventional practice to employ plasticizers in polyvinylchloride insulation materials such as are commonly used to provide insulation over electrical wiring. Plasticizers are used both as processing aids during handling of the polyvinylchloride resin formulation and its extrusion on to the electrical wire and also as end use modifiers where they affect the chemical and/or physical characteristics of the insulation on the final electrical product.

While many types of plasticizers are used in polyvinylchloride insulation covering on electrical wires and cables, the most widely employed are polybasic aromatic acid esters. These plasticizers are the reaction products of aliphatic alcohols with polybasic aromatic acids, principally phthalic acid and trimellitic acid.

The most widely used polybasic aromatic acid esters are dialkyl phthalates, examples of which include di-2-ethylhexyl phthalate (DOP), di-isooctyl phthalate (DIOP), di-isodecyl phthalate (DIDP), di-N-octyl N-decyl phthalate (DNODP), di-N-decyl phthalate (DNDP) di-undecyl phthalate (DUP) and di-tridecyl phthalate (DTDP). The aforementioned phthalatic acid based plasticizers are conventionally used in low to moderate temperature applications. However, in high temperature wiring applications, e.g., 90° C. and 105° C. wiring, it is a conventional practice to use plasticizer systems composed of substantial amounts of trimellitate esters. The trimellitate esters are considered to be more stable to oxidation loss from the polyvinylchloride resin formulation and thus more suitable for use in high temperature environments. Trimellitate acid based plasticizers include trioctyl trimellitate (TOTM) triisooctyl trimellitate (TIOTM), N-octyl, N-decyl trimellitate and triisononyl trimellitate (TINTM).

In addition to containing plasticizers, polyvinylchloride insulations will also normally contain stabilizers to retard degradation of the PVC during processing and during use, antioxidants and fillers. The stabilizers may be either organic, or inorganic, or combinations of both. The antioxidants are added in order to prevent oxidative degradation of the plasticizer and also the polyvinylchloride resin. The antioxidants normally employed in formulating PVC insulation are sterically hindered phenols. Bisphenol A (BPA) is the most widely used. Bisphenol A is employed in PVC formulations in only very small amounts, usually substantially less than one weight percent based on the amount of plasticizer in the formulation.

DISCLOSURE OF THE INVENTION

In accordance with the present invention there is provided new and improved polyvinyl chloride insulation for relatively high temperature electrical wiring products and a process for manufacturing such products. The insulated wiring product of the present invention has a surface temperature classification of at least 90° C. and comprises an electrical conductor and an insulation covering on the conductor formulated from PVC resin, a polybasic aromatic acid ester plasticizing system, and an antioxidant. The polyvinyl chloride resin is characterized as having an inherent viscosity within the range of 1.0–1.1. The predominant ester component in the plasticizing system is di - (R,R') phthalate ester wherein R and R' are each independently an alkyl group containing at least eleven carbon atoms. The antioxidant is present in an amount effective to prevent oxidation of the dialkyl phthalate ester at the UL testing temperature associated with the service temperature classifications of 90° C. and 105° C.

Preferably, the inherent viscosity of the PVC resin is within the range of 1.01–1.06 and each of the alkyl groups of the dialkyl phthalate ester independently contain from 11–13 carbon atoms. It is also preferred that the plasticizing system contain at least 80 percent by weight of the dialkyl phthalate ester with trimellitate ester, if any, being present in the amount of 0–20 weight percent. In a further aspect of the invention, the insulation contains an epoxidized plasticizer in an amount within the range of 2–10 phr (weight parts per hundred parts resin) based upon the PVC resin.

The invention also provides a process for the production of an insulated electrical wiring product. In carrying out this process, a hot melt is formed of polyvinyl chloride resin, a polybasic aromatic acid ester plasticizing system, and an antioxidant. The predominant ester component of the plasticizing system is a di (R,R') phthalate ester wherein each of the R,R' alkyl groups independently contain at least 11 carbon atoms. The antioxidant is present in an amount equivalent to least 1.5 weight percent bisphenol A based upon the aromatic acid ester plasticizing system. The hot melt that is formulated is extruded onto an electrical conductor and then cooled on the conductor to form the insulated wiring product.

In one embodiment of the invention, the aromatic acid ester plasticizer system contains the dialkyl phthalate ester in an amount significantly greater than 80 percent. Preferably, substantially all of the aromatic ester in the plasticizer system is the dialkyl phthalate ester with little or no trimellitate ester. In a specific embodiment of the invention, the hot melt is extruded onto the electrical conductor at a temperature of 195 ° C. or less and at a rate of at least 3500 feet per minute of the conductor. In a further embodiment of the invention, the hot melt is extruded onto the conductor in an amount to provide an average insulation thickness after cooling which is no greater than 0.8 millimeters (corresponding to 30 mil insulation) and, more specifically, no greater than 0.4 millimeters (corresponding to 15 mil insulation).

BEST MODES FOR CARRYING OUT THE INVENTION

In making insulated electrical wiring product a hot melt of polyvinyl chloride is formulated by appropriate compounding techniques and extruded upon an electrical conduit such as copper or aluminum wire or the like. The components which may be used in the formulation procedure include, in addition to the polyvinyl chloride resin, plasticizers, and antioxidants discussed above, stabilizers, lubricants, fillers and colorants. Techniques and materials which are commonly employed in the formulation of plasticized polyvinyl chloride compounds and the effects of the various components upon product properties and processing parameters are disclosed in chapter 17 of Encyclopedia of PVC, Nass, L.I., editor, Marcell Decker, Inc., 1976, pages 847–880, the disclosure which is incorporated herein by reference.

After formulating the hot melt, it is extruded onto the electrical conductor by any suitable technique and the resulting product then cooled to arrive at the final product. In the extrusion procedure, the conductor wire is straightened, optionally heated, and then passed through the extrusion die where the hot melt is applied to the wire. Thereafter, the coated wire product is cooled, for example, by a passage through a water trough, and then spooled for storage and shipping. Extrusion of the hot melt on to the wire may be accomplished by any suitable technique such as disclosed in Kirk- Othmer , Encyclopedia of Chemical Technology, Third Edition, 1982, John Wiley & Sons, volume 18, Plastics Processing, pages 194–199, the disclosure of which is incorporated herein by reference.

In the present invention, a novel polyvinyl chloride hot-melt formulation is employed to arrive at new and improved wiring products which meet high temperature service requirements while employing polybasic aromatic ester plasticizing systems in which the predominant ester component is a phthalic acid ester, or mixtures of phthalic acid esters, characterized as a di (R,R′) phthalate ester wherein R and R′ are each independently an alkyl group containing at least 11 carbon atoms.

As noted previously, both trimellitate and phthalate esters are conventionally employed as plasticizers in polyvinyl chloride insulation for electrical products. Such plasticizers and their mode of action, both as processing aids and as end point modifiers, are disclosed in the aforementioned Kirk-Othmer Encyclopedia of Chemical Technology, Volume 18 "Plasticizers" pages 126–152, the disclosure which is incorporated herein by reference. The phthalic acid esters are substantially cheaper than the trimellitates and for this reason alone are often preferred for use in polyvinyl chloride formulations. The phthalic acid esters are widely used in the low to moderate temperature wiring products, e.g., those having service temperatures of 60° C. and 75° C. However, the phthalic acid esters are more volatile and more easily oxidized than the trimellitate esters. Thus, for relatively high temperature usage, trimellitate esters, which are more stable and resistant to oxidation, have been employed as the sole or predominant component of the polybasic aromatic ester plasticizing systems, not withstandin that the trimellitates are substantially more expensive than the phthalates. For example, as shown in Table 5, page 144, volume 18 of Kirk-Othmer, the plasticizer system for each of the 60° C. and 75° C. insulation is a phthalate ester system. However, when going from the 75° C. service temperature classification to the 90° C. temperature classification, the plasticizer system is changed from 50 phr. (parts per hundred parts of PVC) phthalate to a system containing 13 phr diundecyl phthalate and 28 phr trimellitate ester. In the 90° C. product, bisphenol A is employed in an amount of 0.25 phr as an antioxidant For the 60, 75, and 90° C. materials the stabilizer is an inorganic lead silicate or sulfate. For the 105° C. material, the plasticizer is changed to a linear polyadipate and epoxidized soya oil is employed in an amount of 5 phr. as a plasticizer, stabilizer.

In addition to service temperature, the insulation thickness of the wiring product has also influenced the composition of the polybasic aromatic ester plasticizing system. Specifically, the thickness of the insulation, and to a lesser extent, the gauge of the wire, dictates the surface area of insulation per unit volume exposed to an oxidative environment. Thus, relatively thin insulation has been considered to require a relatively high amount of trimellitate in the plasticizer system. Also, the thinner insulation allows easier heat penetration through the insulation wall. Accordingly it has been a conventional practice to increase the trimellitate content as the insulation thickness decreases. Thus, for 30 mil. insulation (approximately 0.8 millimeters in thickness) the maximum of phthalate concentration has been 50% phthalate and 50% trimellitate. However, when the insulation thickness is decreased to 15mil, the maximum for 90° C. insulation has heretofore been considered to be about 25% phthalate ester, 75% trimellitate ester.

Antioxidants have heretofore been employed in relatively low concentrations, typically less than one percent by weight based upon the polybasic aromatic acid ester plasticizing system. The antioxidant concentration has been limited because of concern that too much antioxidant in the PVC formulation would cause an unacceptable decrease in volume resistivity and also result in plasticizer being exuded from the insulation surface. Thus, bisphenol A, 2,2-bis[4-hydroxyphenol-propane, the antioxidant most widely used in plasticized polyvinyl chloride insulation formulations, is normally present in an amount no greater than about one-half weight percent based upon the amount of polybasic aromatic acid ester plasticizing system in the formulation. For example, in the 75° C. and 90° C. service temperature classifications referred to previously (Table 5, page 144, Volume 18 of Kirk-Othmer), bisphenol A is present in concentrations of about 0.5–0.6 percent based upon the amount of plasticizer present.

The present invention involves the use of a polyvinyl chloride formulation suitable for high service temperature electrical insulation in which the predominant plasticizer component is a phthalic acid ester, or mixtures of such esters, and in which an antioxidant is present in an amount above that normally considered to be acceptable. The phthalic acid ester component preferably constitutes at least 80 percent of the aromatic acid ester plasticizer components present in the formulation. The remainder, if any, may take the form of trimellitate ester. Stated otherwise where the phthalic acid ester component is at least 80 wt percent of the plasticizers system, the trimellitate ester component or components will range from 0–20 percent of the polybasic aromatic acid ester plasticizer system. Usually, it will be desirable for economic reasons to provide that the dialkyl phthalate ester content is substantially greater than 80 percent, so that the trimellitate ester content is substantially less than 20 percent for both the 90° C. and 105° C. service temperature products as described hereinafter In fact, even for 105° C. products, trimellitate ester need not be present and phthalate ester may constitute the sole component of the polybasic acid ester plasticizer system.

The phthalic acid esters, employed in the present invention, are characterized as dialkyl phthalates in which each alkyl group contains at least 11 carbon atoms. Suitable phthalate esters thus include di-undecyl phthalate, di-dodecyl phthalate and di-tridecyl phthalate. Such phthalic acid esters can be readily prepared by reaction of phthalic acid or phthalic anhydride with the appropriate aliphatic alcohols, or mixtures of aliphatic alcohols, if mixed diesters are desired. Where the alkyl groups are undecyl groups they should be substantially linear. The higher alkyl groups can include increasing amounts of branch chain isomers. As a practical matter, the alkyl groups normally will not contain more than 13 carbon atoms simply because of the difficultly in synthesizing the derives of the C13 +aliphatic alcohols. Thus, the phthalic acid esters normally employed in the present invention, may be characterized as di (R,R′) phthalate esters in which R and R′ are each independently an alkyl group containing from 11 to 13 carbon atoms.

The phthalic acid esters may be employed in high temperature insulations, specifically those insulations having service temperature classifications of 90° C. and 105° C. As will be understood by those skilled in the art, the service temperature requirements are determined by standard testing procedures as set forth in UL 83 "Standard for Thermoplastic-Insulated Wires and Cables" Underwriters Laboratories, Inc., Eighth Edition 1980 The standard 90° C. wire may have an average insulation thickness of 15 mils (approximately 0.4 millimeters) or 30 mil of polyvinyl chloride insulation. For the 105 wire, the insulation includes polyvinyl chloride of 15 mils in thickness which is covered by a nylon jacket, having a thickness of about 4–6 mils. The standard ageing test for both the 90° C. and the 105° C. product involves ageing the polyvinyl chloride insulation in an air circulating oven at 136° C. for 7 days. For both products, the specimen tested is stripped from the conductor before ageing. For the 105° C. product, the nylon jacket is removed prior to the ageing test. In each case, the physical properties of the insulation measured at the conclusion of the ageing period should meet certain retention parameters as specified in UL 83, Table 14.1. Specifially, the minimum acceptable retention of tensile strength is 75% of the result measured for the unaged specimen. The minimum acceptable retention of elongation is 45% of the result for the unaged specimen for a die-cut specimen and 65% of the result for the unaged specimen of the insulation as stripped from the conductor.

Antioxidants which may used to prevent or retard oxidative degradation of the plasticizer components during use and also during processing include phenolic antioxidants and aromatic amines. Phenolic type antioxidants commonly employed in polyvinyl chloride compounding include phenol, butylated hydroxytoluene, bisphenol A (2,2-bis (4- hydroxyphenol) propane), 2,6 di-tert-butyl-p-cresol, p-tert-butylphenol, p-nonylphenol, 2, p-methylenebis (4-methyl-6-tert-butylphenol) and topanol CA (1,1,3-tris (2-methyl- 4-hydroxy-5-tert methyl phenyl) butane). Other well known sterically hindered phenols which function as oxidation inhibitors include 2,6-di-tert-butyl phenol, 2,6-di-tert-butyl-4-hydroxymethyl phenol, 2,6-diisopropyl phenol, 2,6-di-tert-amyl phenol, 2-isopropyl-6-tert-butyl phenol, 2-tert-butyl-6-tert-amyl phenol, 2,6-bis(4-hydroxyphenyl) phenol, 2,6-bis(4-hydroxybenzyl) phenol, 2-tert-butyl-6-(4-hydroxbenzyl) phenol, 1,3,5-trimenthylbutyl-2,4,6-tris(3,5-di-tert-butyl-4-hydroxybenzyl) benezene, 2,4,6-tris(2-hydroxytertbutyl) phenol and 2,4,6-tri-tert-butyl phenol.

As will be understood by those skilled in the art, other suitable oxidation inhibitors which function as free radical chain inhibitors may be used. The sterically hindered phenolic compounds as described previously include phenols substituted at the 2 and 6 positions with relatively bulky pendant groups which function to crowd the hydroxy group and promote disassociation thereof to provide a relatively stable free radical. The 2,6 substituents typically may take the form of branched alkyl radicals such as isopropyl, tert butyl and tert amyl radicals, aryl groups such as phenyl and benzyl groups and substituted phenyl and benzyl groups as well as other bulky groups which act sterically to promote disassociation of the hydroxy group on the aromatic ring. Such, 2,6 substituted aromatic compounds may also contain a substituent, commonly an alkyl group, at the 4 position.

The most commonly used antioxidant in the formulation of polyvinyl chloride insulation, is bisphenol A and this is the antioxidant preferred for use in this invention. Thus, the invention will be described in detail with reference to bisphenol A as the antioxidant. However, it will be recognized that other antioxidants may also employed in carrying out the invention. These antioxidants, like bisphenol A, should be employed in higher than normal concentrations which may be calculated by reference to the equivalent amount of bisphenol A. For example, topanol CA, although not widely used, is a much stronger antioxidant and can be employed in an amount of about one seventh of the amount of bisphenol A to achieve equivalent results.

In the preferred embodiment of the invention, the bisphenol A is added to the formulation in an amount in excess of 1 wt percent based upon the polybasic aromatic acid ester plasticizer in the formulation and preferably in an amount of at least about 1.5 wt percent.

In addition to the predominantly phthalate ester plasticizing system and higher than normal amount of antioxidant, it is also preferred in carrying out the invention to add a minor amount an epoxidized plasticizer which functions as a stabilizing agent. Epoxidized plasticizers which have heretofore been employed in PVC compounding, and which may be employed in the present invention, include epoxidized esters and ethers including mono- and poly-esters and ethers, epoxidized vegetable oils, polyether epoxide resin condensates such as the condensation product of epichlorohydrin and bisphenol A, octyl epoxytallate, and epoxystearates such as isooctyl, butyl, or 2- ethylhexyl epoxystearate. The epoxy group may also be incorporated in the formulation using epoxidized paraffins such as 1-epoxy-decane. Epoxidized plasticizers preferred for use in the present invention are epoxidized vegetable oils and specifically epoxidized soybean oil and linseed oil, with the former being preferred. The epoxidized soybean oil or other stabilizers employed in the present invention functions to retard degradation of the polyvinyl chloride resin by scavenging of HCL as will be understood by those skilled in the art. In addition, the polyvinyl chloride formulated with the polybasic aromatic acid ester plasticizer, antioxdant, and epoxy plasticizer in accordance with the invention is more readily extruded than prior art formulations and enables the extrusion process to carried out at lower temperature and/or higher extrusion rates than experienced with the prior art formulations.

The polyvinyl chloride employed in the present invention should be of a moderately high molecular weight. Normally the PVC resin will have an inherent viscosity within the range of 1.0–1.1. By the term inherent viscosity as used herein is meant the inherent viscosity of the resin as determined by the test procedure of ASTM-D-1243-66. Viscosities below 1.0 should be avoided since the use of such lower molecular weight resins may result in an unacceptable decrease in the strength properties of the coating. Inherent viscosities above 1.1 can be employed in terms of the strength characteristics of the coating, but may lead to processing difficulties in extruding the hot melt on to the wire. The optimum molecular weight of the resin for the high phthalate ester plasticizing systems is within an inherent viscosity range of 1.01-1.06 and this is a preferred in carrying out the invention.

In compounding the polyvinyl chloride formulation, the resin is heated to a temperature of about 140°-150° F. This processing temperature often may be reached simply by charging the resin at room temperature to a high intensity mixer and depending upon the frictional heat developed within the mixer to raise the batch temperature to the 140°-150° F. range. Thereafter, a warm plasticizer, at about 90° F., is added and mixed into with the resin. The phthalate ester is easier to mix than trimellitate and thus for processing reasons, as well as for the reasons advanced previously, it is desirable that the aromatic acid ester plasticizer systems contain 80%, 90% or even 100% phthalic acid ester. On the other hand, it will sometimes be advantageous to incorporate some trimellitate ester into the plasticizer system, albeit that this will add to the cost of the final product. For example, a minor amount of trimellitate will provide a "safety factor" for the extrusion and coating procedure in the event the temperature profile deviates from the design specification. The trimellitate ester, if employed, should be added in an amount of 1-20 weight percent of the aromatic acid ester plasticizer system and more preferably, in an amount of about 1-10 weight percent. A suitable plasticizer system in accordance with this embodiment of the invention, is one containing about 90% phthalic acid ester and about 10% trimellitate ester. The trimellitates so employed can be any of those commonly used in polyvinyl chloride processing and normally will take the form of trialkyl trimellitate esters in which each alkyl group contains at least seven carbon atoms. Such esters include trioctyl trimellitate, triisooctyl trimellitate, N-octyl, N-decyl trimellitate and triisononyl trimellitate. The plasticizer normally is added in the amount of about 44-55 phr based upon the polyvinyl chloride resin. In a specific embodiment of the invention, the aromatic acid ester plasticizer is mixed with the epoxidized vegetable oil and the resulting blend then added to the resin. The epoxidized vegetable oil, preferably epoxidized soya oil, is used in an amount within the range of 2-10 phr.

After addition of the plasticizer, a stabilizer such as dibasic lead phthalate is added in an amount normally within the range of about 5-8 phr. Other stabilizers such as barium, cadmium soaps and liquids may also be used. Such stabilizers are well known to those skilled in the art. Thereafter, a filler, if one is employed, is added to the formulation. Any suitable filler, which typically functions as an extender and also to impart opacity to the formulation, may be used. A suitable filler is a mixture of clay and calcium carbonate which is added in amounts normally within the range of about 10-30 phr. Subsequent to addition of the filler, a lubricant usually will be added in order to facilitate the extrusion procedure. Suitable lubricants include fatty acids and soaps and esters of fatty acids and normally will be used in amounts of about 1.0 phr or less. A typical lubricant is stearic acid added in an amount of 0.5 phr. The bisphenol A may be added to the formulation at any point in the compounding procedure. Normally, it will be added with the charging of the resin to the mixer, added to the plasticizer when it is charged to the mixer, or added to the lubricant when it is applied to the formulation.

As noted previously, the use of PVÇ hot-melt formulated in accordance with the present invention renders the hot-melt more readily extrudable. Thus, the extrusion procedure can be carried out at a somewhat lower temperature and higher rate than normal for prior art formulations. While the temperature profile and rate of coating of the hot- melt on the conductor is equipment variable, in general the extrusion process can be carried at a temperature of less than 195° C. and at a rate of at least 3500 feet per minute. In extruding PVC insulation on 14 gauge solid copper ire, the use of 100 percent phthalic ester plasticizing system in the present invention allowed the extrusion rate to be increased from 3000 feet per minute to 4200 feet per minute.

As noted previously the present invention may be employed in the production of 15 mil (thin wall) and 30 mil insulation and can be used for both 90° C. and 105° C. service temperature classifications. In each case, 100 percent phthalic acid ester plasticizer (no trimellitate present) can be used successfully. The formulations are similar with only minor changes involved in going from one type of product to another. For example, all other things being equal, the 15 mil insulation normally will contain a slightly lower concentration of plasticizer than the 30 mil insulation. Also, calcium carbonate filler may be omitted from the 15 mil insulation.

Representative formulations for 15 mil and 30 mil insulation thicknesses for 90° C. service temperature classification are set forth in Table I. In this table, all of the concentration of the components are expressed in phr weight based upon the PVC resin.

TABLE I

| Components | 30 mil | 15 mil |
|---|---|---|
| PVC Resin | 100 | 100 |
| Clay | 10 | 8 |
| $CaCO_3$ | 7 | |
| Stabilizer | 7 | 7 |
| DUP | 46 | 44 |
| Epoxy Soya Oil | 2 | 2 |
| Lubricant | 0.5 | 0.4 |
| BPA | .95 | .95 |

The stabilizer employed in the above formulations is dibasic lead phthalate and the lubricant a mixture of fatty acid esters Insulation coverings having the formulations of Table I, after aging, at 136° C. for seven days, typically exhibit tensile stength retention in excess of 90% and ultimate elongation retention in excess of 80%. These values are, of course, well above those required by UL 83. In the above formulations the aromatic acid ester plasticizing system is 100% phthalic acid ester However, a minor amount of trimellitate ester can be incorporated as described previously. For example, in each of the formulations of Table I, the diundecyl phthalate content can be reduced by four parts per hundred, and four parts per hundred of a trimelletic acid ester such as tri-isononyl trimellitate added to the plasticizer formulation.

Having described specific embodiments of the present invention, it will be understood that modifications thereof may be suggested to those skilled in the art, and it is intended to cover all such modifications as fall within the scope of the appended claims.

I claim:

1. In an insulated electrical wiring product having a service temperature classification of at least 90° C., the combination comprising:

(a) an electrical conductor;

(b) an insulation covering on said conductor having a UL -83 service temperature classification of at least 90° C. formulated of a polyvinyl chloride resin having an inherent viscosity within the range of 1.0–1.1, a polybasic aromatic ester plasticizing system 10 containing at least 80 weight percent of di-(R,R') phthalate ester wherein R and R' are each independently an alkyl group containing at least eleven carbon atoms, and an effective amount of an antioxidant to prevent oxidation of said di-alkyl phthalate ester at 136° C.

2. The combination of claim 1 wherein the inherent viscosity of said polyvinyl chloride resin is within the range of 1.01–1.06.

3. The combination of claim 1 wherein said antioxidant is bisphenol A present in an amount of at least 1.5 weight percent based upon the amount of said polybasic aromatic acid ester plasticizing system in said insulation covering.

4. The combination of claim 1 wherein said insulation covering contains an epoxidized vegetable oil in amount within the range of 2–10 phr.

5. The combination of claim 4 wherein said epoxidized vegetable oil is epoxidized soybean oil.

6. The combination of claim 1 wherein said insulation covering has a thickness no greater than 0.8 mm.

7. The combination of claim 1 wherein said insulation thickness is no greater than 0.4 mm.

8. The combination of claim 1 wherein said polybasic aromatic acid ester plasticizing system contains from 1–20 weight percent of a trimellitate ester.

9. The combination of claim 8 wherein said polybasic aromatic acid ester plasticizing system contains about 90% weight percent of said dialkyl phthalate ester and about 10% weight percent of said trimellitate ester.

10. The combination of claim 1 wherein each of R and R' in said dialkyl phthalate ester each independently contain from 11–13 carbon atoms.

11. The product of claim 1 having a UL service temperature classification of 105° C.

12. The product of claim 1 wherein said insulation covering contains a mixture of clay and calcium carbonate as a filler.

13. The product of claim 12 in which said mixture of clay and calcium carbonate is in a amount within the range of 10–30 phr.

* * * * *